US008670393B2

(12) United States Patent
Jain et al.

(10) Patent No.: US 8,670,393 B2

(45) Date of Patent: Mar. 11, 2014

(54) TAGGING LANGUAGE FOR BROADCAST RADIO

(75) Inventors: Nikhil Jain, Mumbai (IN); Parag Palsapure, Navi Mumbai (IN)

(73) Assignee: Qualcomm Incorporated, San Diego, CA (US)

( * ) Notice: Subject to any disclaimer, the term of this patent is extended or adjusted under 35 U.S.C. 154(b) by 982 days.

(21) Appl. No.: 11/738,241

(22) Filed: Apr. 20, 2007

(65) Prior Publication Data

US 2007/0248055 A1 Oct. 25, 2007

Related U.S. Application Data

(60) Provisional application No. 60/794,040, filed on Apr. 20, 2006.

(51) Int. Cl.

*H04W 4/00* (2009.01)
*H04H 20/71* (2008.01)
*H04B 1/18* (2006.01)
*H04B 7/00* (2006.01)
*H04M 1/00* (2006.01)
*G08G 1/09* (2006.01)
*G08B 21/00* (2006.01)

(52) U.S. Cl.

USPC ........ 370/329; 370/328; 370/312; 455/550.1; 455/186.1; 455/512; 455/567; 340/905; 340/540; 381/86; 704/235; 709/218

(58) Field of Classification Search

USPC ........................................................ 370/331
See application file for complete search history.

(56) References Cited

U.S. PATENT DOCUMENTS

| | | | |
|---|---|---|---|
| 5,214,792 | A | 5/1993 | Alwadish |
| 5,239,681 | A | 8/1993 | Parnall et al. |
| 5,465,088 | A | 11/1995 | Braegas |
| 5,661,811 | A | 8/1997 | Huemann et al. |
| 5,907,793 | A | 5/1999 | Reams |
| 5,949,492 | A | 9/1999 | Mankovitz |
| 6,173,165 | B1 | 1/2001 | Ruhl et al. |
| 6,332,120 | B1 | 12/2001 | Warren |
| 6,530,082 | B1 | 3/2003 | Del Sesto et al. |
| 6,975,835 | B1 | 12/2005 | Lake et al. |
| 7,231,176 | B2 | 6/2007 | Levy |

(Continued)

FOREIGN PATENT DOCUMENTS

| | | |
|---|---|---|
| CN | 1241093 A | 1/2000 |
| CN | 1507186 | 6/2004 |

(Continued)

OTHER PUBLICATIONS

International Search Report issued Dec. 6, 2007 for PCT/US2007/067121.

(Continued)

*Primary Examiner* — Timothy Pham
(74) *Attorney, Agent, or Firm* — Abdollah Katbab

(57) ABSTRACT

Apparatus, methods, processors and computer programs products for generating or processing a broadcast radio transmission comprising multimedia content and supplemental information corresponding to the multimedia content. The supplemental information comprises a selected data group from a plurality of predetermined data groups each comprising different data, wherein the selected data group further comprises a tag and a corresponding set of text data operable to initiate a predetermined capability of a wireless device.

54 Claims, 7 Drawing Sheets

(56) References Cited

U.S. PATENT DOCUMENTS

| | | | |
|---|---|---|---|
| 2001/0025376 A1 | 9/2001 | Knobl | |
| 2003/0054804 A1 | 3/2003 | Brandes et al. | |
| 2003/0119441 A1 | 6/2003 | Simons et al. | |
| 2004/0110522 A1 * | 6/2004 | Howard et al. | 455/512 |
| 2004/0176061 A1 | 9/2004 | Zehnle et al. | |
| 2004/0198279 A1 | 10/2004 | Anttila et al. | |
| 2005/0020223 A1 * | 1/2005 | Ellis et al. | 455/186.1 |
| 2005/0054286 A1 | 3/2005 | Kanjilal et al. | |
| 2005/0086702 A1 | 4/2005 | Cormack et al. | |
| 2005/0181838 A1 | 8/2005 | Matsuda et al. | |
| 2005/0249139 A1 | 11/2005 | Nesbit | |
| 2005/0271219 A1 | 12/2005 | Bruelle-Drews | |
| 2005/0287972 A1 | 12/2005 | Christensen et al. | |
| 2006/0045285 A1 | 3/2006 | Bremermann | |
| 2006/0083388 A1 | 4/2006 | Rothschild | |
| 2006/0128418 A1 | 6/2006 | Quelle et al. | |
| 2006/0197753 A1 | 9/2006 | Hotelling | |
| 2006/0264171 A1 | 11/2006 | Kwon et al. | |
| 2006/0268763 A1 | 11/2006 | George | |
| 2007/0010221 A1 | 1/2007 | Howard et al. | |
| 2007/0116297 A1 | 5/2007 | Mishra | |
| 2007/0143218 A1 * | 6/2007 | Vasa | 705/51 |
| 2007/0196802 A1 | 8/2007 | Beletski et al. | |
| 2007/0250597 A1 | 10/2007 | Resner et al. | |
| 2008/0036653 A1 | 2/2008 | Huston | |
| 2008/0212785 A1 | 9/2008 | Ullmann | |
| 2008/0313697 A1 | 12/2008 | Rajan et al. | |
| 2009/0045951 A1 | 2/2009 | Rajan et al. | |
| 2009/0282430 A1 * | 11/2009 | Gupta et al. | 725/20 |

FOREIGN PATENT DOCUMENTS

| | | | |
|---|---|---|---|
| CN | 1647551 | A | 7/2005 |
| CN | 1701520 | A | 11/2005 |
| CN | 1702605 | A | 11/2005 |
| EP | 0283708 | A2 | 9/1988 |
| EP | 0967748 | | 12/1999 |
| EP | 0977389 | | 2/2000 |
| EP | 1434371 | | 6/2004 |
| JP | 6334548 | A | 12/1994 |
| JP | 8179793 | A | 7/1996 |
| JP | 8279796 | A | 10/1996 |
| JP | 8339490 | A | 12/1996 |
| JP | 9051511 | A | 2/1997 |
| JP | 9205379 | | 8/1997 |
| JP | 10502499 | T | 3/1998 |
| JP | 10256927 | A | 9/1998 |
| JP | 10327112 | A | 12/1998 |
| JP | 11355229 | | 12/1999 |
| JP | 2004509509 | A | 3/2004 |
| JP | 2004364245 | A | 12/2004 |
| JP | 2006094326 | A | 4/2006 |
| JP | 2006101561 | A | 4/2006 |
| JP | 2006512022 | T | 4/2006 |
| JP | 2007025930 | A | 2/2007 |
| JP | 2009506802 | A | 2/2009 |
| JP | 2009534953 | A | 9/2009 |
| KR | 20000049405 | A | 8/2000 |
| KR | 1020020000563 | A | 1/2002 |
| KR | 20030090826 | A | 12/2003 |
| KR | 1020050026937 | | 3/2005 |
| KR | 1020050039536 | | 4/2005 |
| WO | WO0223773 | | 3/2002 |
| WO | WO 02093400 | | 11/2002 |
| WO | WO2004068730 | A1 | 8/2004 |
| WO | WO2005068494 | | 7/2005 |
| WO | WO2007032759 | A1 | 3/2007 |
| WO | 2007124441 | A2 | 11/2007 |

OTHER PUBLICATIONS

Nokia Press Release, "Kiss FM Begins Visual Radio Broadcasts," Mar. 4, 2005.

RDS Forum 2005, R05/036_1, "Radiotext plus (RTplus), Specification," Version 1.0, Jun. 13, 2005.

R.V. R. Elettronica SpA., "WINRDS User Manual",Version 1.0, Oct. 7, 2003.

T. Ogawa et al., "LSI for RDS broadcasting, multiplex of digital data to FM signal." Nikkei Electronics. Aug. 24, 1987, No. 428. pp. 201-217.

Davies P: "The radio system-traffic channel" Vehicle Navigation and Information.Systems Conference, 1989. Conferenc e Record Toronto, Ont., Canada Sep. 11-13, 1989, New York, NY, USA,IEEE, US, Sep. 11, 1989, pp. A44-A48, XP010034419.

De Groot M T: "Rhine-Corridor An RDS-TMC Pilot For Radio Traffic Information" Sep. 2, 1992-Sep. 4, 1992, pp. 8-13, XP010259475.

Herbert M: "The Road Traffic Advisor project" Mar. 3, 1999, pp. 7/1-713, XP006500626.

Sammo Cho et al: "System and Services of Terrestrial Digital Multimedia Broadcasting (T-DMB)" IEEE Transactions on Broadcasting, IEEE Service Center, Piscataway, NJ, US, vol. 53, No. 1, Mar. 1, 2007, pp. 171-178, XP011172014.

Translation of Office Action in China application 2008-0020637 corresponding to U.S. Appl. No. 12/139,922, citing CN1701520 dated Feb. 21, 2011.

Translation of Office Action in Japanese application 2010-513358 corresponding to U.S. Appl. No. 12/139,922, citing JP9051511, JP10327112, JP08339490, JP08179793, JP10502499, JP2006512022 and US20070116297 dated Dec. 7, 2010.

Van Coile B et al: "Speech synthesis for the new Pan-European traffic message control system RDS-TMC" Speech Communication, Elsevier Science Publishers, Amsterdam, NL, vol. 23, No. 4, Dec. 1, 1997, pp. 307-317, XP004117221.

Written Opinion—PCT/US2007/067121, International Search Authority, European Patent Office, Dec. 6, 2007.

U.S. RBDS Standard, "Specification of the radio broadcast data system (RBDS)", National Association of Broadcasters, Apr. 9, 1998, pp. 2-204.

Wright S., "RBDS versus RDS—What are the differences and how can receivers cope with both systems" National Radio Systems Committee, Jan. 1998, pp. 2-11.

* cited by examiner

TAGGING LANGUAGE FOR BROADCAST RADIO

CLAIM OF PRIORITY UNDER 35 U.S.C. §119

The present Application for Patent claims priority to Provisional Application No. 60/794,040 entitled "Tagging Language for RDS/RBDS in FM" filed Apr. 20, 2006, assigned to the assignee hereof and hereby expressly incorporated by reference herein.

BACKGROUND

1. Field

The described aspects relate generally to broadcast radio usage in a receiver. More particularly, the described aspects relate to embedded tags in radio broadcasts.

2. Background

Broadcast radio stations, such FM radio stations, may use a system known as a Radio Data System (RDS) or Radio Broadcast Data System (RBDS), both referred to herein as "RDS," to transmit supplemental information corresponding to their normal radio programming, e.g. music, talk, news, etc. RDS provides a standard protocol for several types of supplemental information transmitted by the broadcast radio stations, such as the identity of the particular radio station, the type of programming, and text information such as the name of an artist and/or song.

For example, broadcast radio stations transmit their programming and the supplemental information in the RDS format as distinct signals multiplexed onto a single carrier. Radio receivers having RDS decoders, such as those included with some wireless communications devices or those in a vehicle, permit a user to listen to the transmitted programming and view the corresponding supplemental information on a display.

Some new specifications and services have been developed that build on or work in conjunction with radio programming comprising RDS. For example, some specifications provide additional messages that can control portions of the supplemental information, such as the display of the radio text information. In another example, some services have been developed to provide content to the receiver using a data connection, where the content is synchronized with the radio programming via the RDS data.

The above-noted solutions attempt to improve the functionality of radio programming, however, in the process, they can consume scarce resources. For example, the specifications that add new messages to RDS consume the limited bandwidth, and in some cases, the limited number of characters, available for supplemental information in the RDS format. Further, the services that require a streaming data connection increase the usage cost for the data service and increase the power usage. Thus, improved solutions are desired to increase the functionality of radio programming.

SUMMARY

Apparatus, methods, processors and computer programs products provide for user interactivity and/or an enhanced user experience with respect to a broadcast radio transmission of multimedia content.

In one aspect, a method of processing radio signals on a wireless device comprises receiving a broadcast radio transmission comprising multimedia content and supplemental information corresponding to the multimedia content. The supplemental information comprises a first data group from a plurality of predetermined data groups each comprising different data, wherein the first data group further comprises a first tag and a corresponding first set of text data. The method also includes detecting the first tag and the first set of text data, and enabling a predetermined capability of the wireless device based on the detected first tag and the detected first set of text data. In a related aspect, at least one processor is configured to processing radio signals on a wireless device, wherein the at least one processor comprises one or more modules for performing the above-stated actions. In another related aspect, a computer program product comprises a computer-readable medium comprising one or more sets of codes for performing the above-stated actions.

In a further aspect, an apparatus comprises means for receiving a broadcast radio transmission comprising multimedia content and supplemental information corresponding to the multimedia content. The supplemental information comprises a first data group from a plurality of predetermined data groups each comprising different data, wherein the first data group further comprises a first tag and a corresponding first set of text data. Also, the apparatus comprises means for detecting the first tag and the first set of text data, and means for enabling a predetermined capability of the wireless device based on the detected first tag and the detected first set of text data.

In yet another aspect, a wireless device comprises a memory, a processor, a receiver, and a receiver module. The memory further comprises a radio enhancer module, where the processor is in communication with the memory and is operable to execute the radio enhancer module. Further, the receiver is in communication with the processor, wherein the receiver is operable to receive a broadcast radio transmission comprising multimedia content and supplemental information corresponding to the multimedia content. The supplemental information comprises a first data group from a plurality of predetermined data groups each comprising different data, wherein the first data group further comprises a first tag and a corresponding first set of text data. Additionally, the receiver module is associated with the receiver, and the receiver module comprises circuitry operable to detect the first tag and the first set of text data. Additionally, the processor is operable to execute the radio enhancer module to monitor the receiver module, wherein the radio enhancer module is operable responsive to detection of the first tag and first set of text data to enable a predetermined capability of the wireless device based on the first tag and the first set of text data.

In still another aspect, a method of generating radio signals for broadcast comprises obtaining multimedia content and obtaining supplemental information corresponding to the multimedia content. The supplemental information comprising a first data group from a plurality of predetermined data groups each comprising different data, wherein the first data group further comprises a first tag and a corresponding first set of text data. The method further includes generating a broadcast radio transmission comprising the multimedia content and the supplemental information corresponding to the multimedia content, wherein the first tag and the first set of text data are operable to enable a predetermined capability of a wireless device in receipt of the broadcast radio transmission and responsive to a detection of the first tag and the first set of text data by the wireless device. In a related aspect, at least one processor is configured to processing radio signals on a wireless device, wherein the at least one processor comprises one or more modules for performing the above-stated actions. In another related aspect, a computer program product comprises a computer-readable medium comprising one or more sets of codes for performing the above-stated actions.

In yet another aspect, an apparatus comprises means for obtaining multimedia content and means for obtaining supplemental information corresponding to the multimedia content. The supplemental information comprises a first data group from a plurality of predetermined data groups each comprising different data, wherein the first data group further comprises a first tag and a corresponding first set of text data. Additionally, the apparatus includes means for generating a broadcast radio transmission comprising the multimedia content and the supplemental information corresponding to the multimedia content, wherein the first tag and the first set of text data are operable to enable a predetermined capability of a wireless device in receipt of the broadcast radio transmission and responsive to a detection of the first tag and the first set of text data by the wireless device.

In a further aspect, a radio broadcaster comprises a memory comprising multimedia content and supplemental information corresponding to the multimedia content, wherein the supplemental information comprises a first data group from a plurality of predetermined data groups each comprising different data, wherein the first data group further comprises a first tag and a corresponding first set of text data. The radio broadcaster also includes a processor in communication with the memory and a broadcast generator in communication with the processor. The broadcast generator is operable to generate a broadcast radio transmission comprising the multimedia content and the supplemental information, wherein the first tag and the first set of text data are operable to enable a predetermined capability of a wireless device in receipt of the broadcast radio transmission and responsive to a detection of the first tag and the first set of text data by the wireless device.

DETAILED DESCRIPTION

The described aspects relate generally to enabling predetermined functionality on a wireless communication device based on a tag and corresponding tag-related data communicated to the wireless communication device in a broadcast radio transmission.

Figure 1:
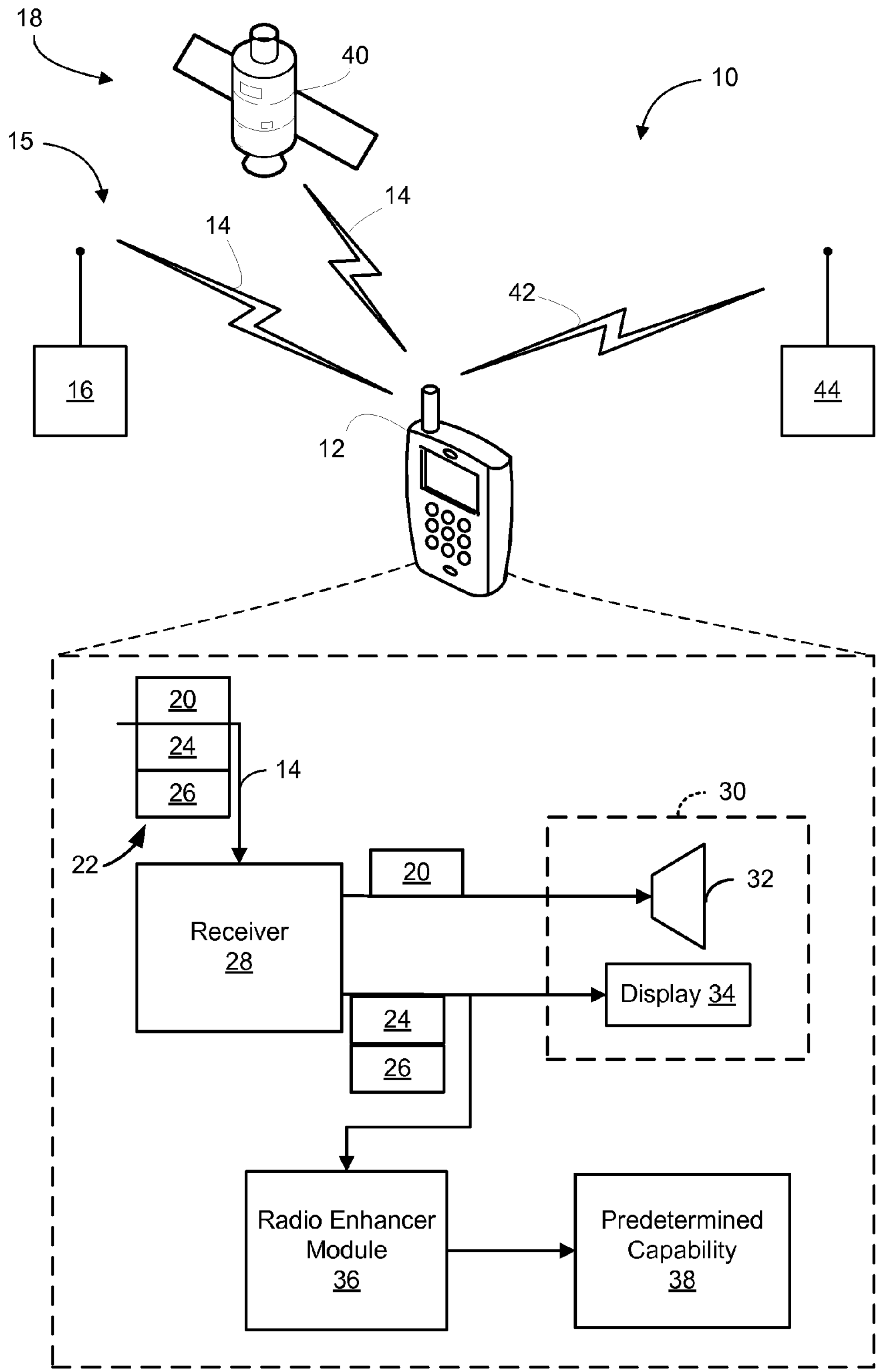
FIG. 1 is a schematic diagram of a system for generating and receiving broadcast radio transmissions including a tagging language.

Referring to FIG. 1, in one aspect, an enhanced broadcast radio system 10 includes a wireless communication device 12 operable to receive a broadcast radio transmission 14 from a broadcast radio network 15, such as a terrestrial-based station 16 and/or a satellite-based station 18. Broadcast radio transmission 14 includes multimedia content 20, such as music or other audio data, and supplemental information 22 corresponding to and/or describing the respective multimedia content 20. In particular, supplemental information 22 may comprise a tag 24 and corresponding data 26 or tag-related data such as a set of one or more data. For example, tag 24 may comprise a known identifier by which corresponding data 26 may be classified, and/or tag 24 may comprise a known trigger for initiating some predetermined action, where the action may utilize corresponding data 26.

Further, wireless communication device 12 includes a receiver 28 operable to detect and separate tag 24 and corresponding data 26 from multimedia content 20, and forward the respective components for rendering on a user interface 30, such as a speaker 32 and a display 34, respectively.

Additionally, wireless communication device 12 includes a radio enhancer module 36 in communication with receiver 28. Radio enhancer module 36 is operable to enable a predetermined capability 38 of wireless communication device 12 based on receiving or detecting tag 24 and corresponding data 26. In particular, predetermined capability 38 includes functionality relating to promoting user interactivity or to enhancing the user experience with respect to broadcast radio transmission 14.

For example, during a radio program represented by broadcast radio transmission 14, tag 24 and data 26 may trigger radio enhancer module 36 to trigger contextual shopping or e-commerce, e.g. generating graphics, text and interactive hot keys to enable the user to download ring tones, songs, album graphics, videos, purchase accessories, etc, associated with multimedia content 20. In another example, tag 24 and data 26 may initiate interactive online polls and quizzes, or provide interactive advertisements allowing the user to request more information of a product or service of interest. In yet other example, tag 24 and data 26 may initiate or invoke other applications resident on wireless device 12, such as a usage history collection and reporting application, and/or a radio station or tuning recommendation application.

In FIG. 1, broadcast radio network 15 may include any publicly or privately owned broadcast radio station that provide users with commercial radio programming, such as a frequency modulation (FM) and/or amplitude modulation (AM) radio station. For example, the broadcast radio transmission 14 broadcast by terrestrial-based radio station 16 includes modulated radio carrier signals that carry information representative of multimedia content, such as music. Further, transmission 14 may additionally include a subcarrier signal that carries supplement information 22 corresponding to the main carrier signal. For example, in an RDS system, subcarrier signal is broadcast at 57 kHz and allows 1187.5 bits/second data rate. As such, terrestrial-based radio station 16 includes equipment necessary to transmit supplemental information 22 along with multimedia content 20. In turn, suitably equipped receivers, such as receiver 28, are operable to receive and decode multimedia content 20 and supplemental information 22, allowing this information to be rendered to the user, as well as allowing for the enhanced functionality described herein. For example, to receive the radio signal transmissions broadcast from terrestrial-based radio station 16, receiver 28 may operate in the FM radio band, or the AM radio band, or both. It should be noted that the range of the FM and AM radio bands vary by country and/or region, and receiver 28 may be adjusted to operate with respect to a given band in a given country and/or region.

Further, satellite-based station 18 may include one or more satellites 40 in orbit around the earth that transmit radio programming, such as music and/or talk radio, to users of wireless communications device 12. Satellite radio providers, such SIRIUS and XM RADIO, provide users with commercial satellite radio programming. In the event that wireless communications device 10 receives broadcast radio transmission 14 via satellite signals, receiver 28 is operable to receive signals in the gigahertz (GHz) range.

Further, in FIG. 1, wireless communications device 12 is additionally operable to communicate with remote devices over a wireless communications network 42 that includes a base station subsystem (BSS) 44 communicatively connected to an antenna 46. Although not illustrated, network 42 may also include other communication network components, such as a base station controller, a mobile switching center, a position determination entity, a group communications server, etc., operable to facilitate communications and services provided to wireless communications device 12. Network 42 may be any private or public wireless communications network operating according to any known standard, including Code Division Multiple Access (CDMA), cdmaOne, cdma2000, Universal Mobile Telecommunication System (UMTS), Wideband CDMA, Global System for Mobile Communications (GSM), and TIA/EIA-136.

Figure 2:
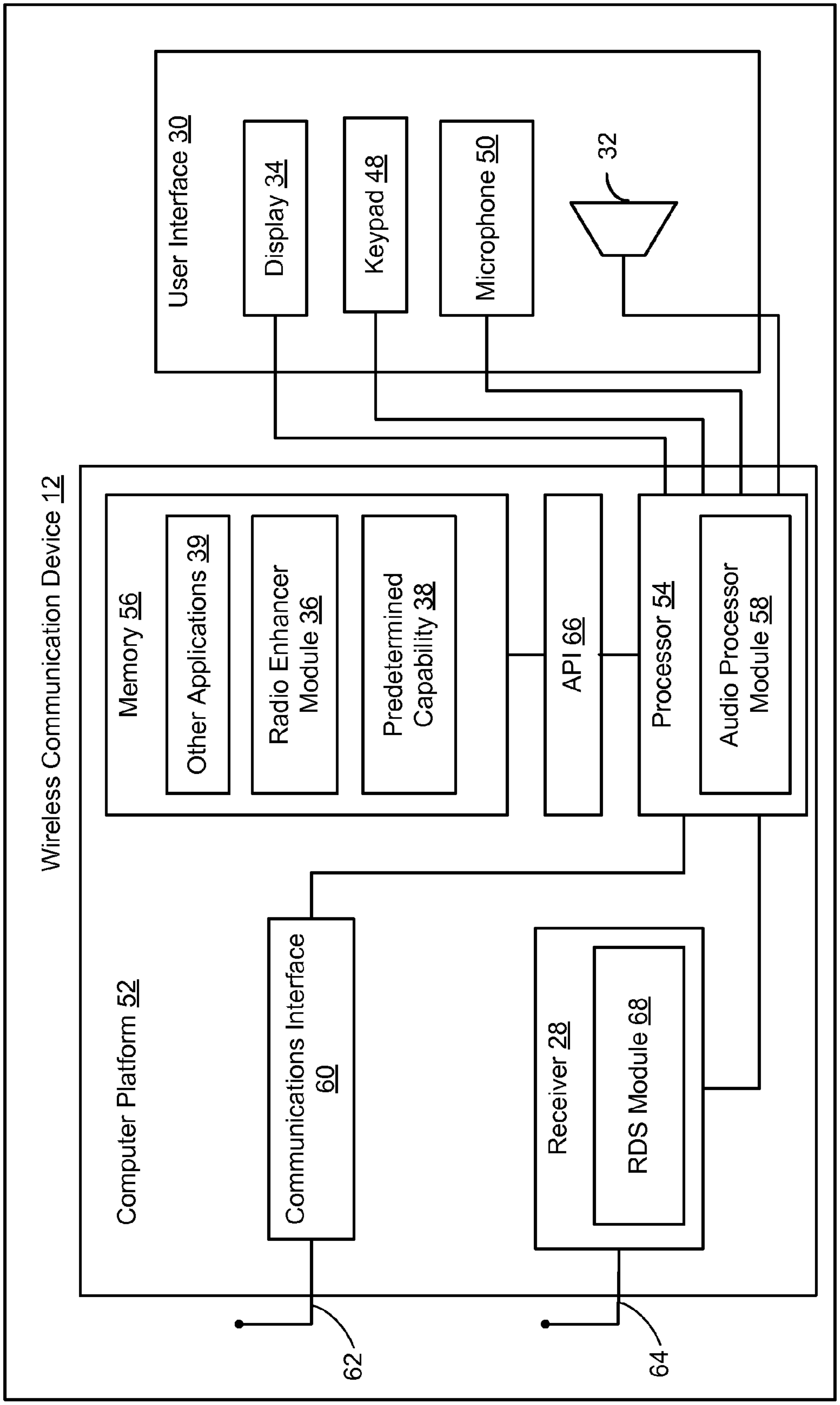
FIG. 2 is a schematic diagram of an aspect of a wireless communication device of FIG. 1.

More specifically, referring to FIGS. 1 and 2, although wireless communication device 12 is illustrated as a cellular telephone, it should be understood that wireless communication device 12 may include any computerized device capable of receiving broadcast signals. Thus, system 10 may include one or more wireless communication devices 12, which may include a cellular telephone, a Personal Digital Assistant (PDA), a satellite telephone, a palm computer, a Personal Communication Services (PCS) device, a portable gaming or music device, etc.

Referring to FIGS. 1 and 2, as noted above, wireless communication device 12 has user interface 30 including at least one input device for generating inputs into communication device, and at least on output mechanism for generating information for consumption by the user of the communication device. For example, an input device may include a mechanism such as a key, keypad 48 and/or keyboard, a mouse, a touch-screen display, a microphone 50, etc. In certain aspects, an input device provides for user input to interact with an application, or program or module, such radio enhancer module 36. Further, for example, an output device may include audio speaker 32, display 34, a haptic feedback mechanism, etc. In the illustrated aspects, display 34 may be operable to present all or portions of supplemental information 22, which may include information such as the station identification, the title of a song and the artist performing the song currently being broadcast by the radio station. Further, in the illustrated aspects, display 34 may present content based on the execution of radio enhancer module 36 and/or based on the initiation of predetermined capabilities 38, as discussed herein.

Further, wireless communications device 12 may include a computer platform 52 that comprises a processor 54, a memory 56, an audio processing module 58, a communications interface 60 connected to an antenna 62, and receiver 36 having an antenna 64.

Processor 54 controls the operation of wireless communications device 12 according to applications or programs or modules stored in memory 56. The control functions may be implemented, for example, in a single microprocessor, or in multiple microprocessors. Suitable microprocessors may include general purpose and special purpose microprocessors, as well as digital signal processors. Further, for example, processor 54 may be an application-specific integrated circuit (ASIC), or other chipset, logic circuit, or other data processing device. Processor 54 or other data processing device such as ASIC may execute an application programming interface (API) layer 66 that interfaces with any resident applications, and/or programs and/or modules, such as radio enhancer module 36, stored in memory 56 of the wireless communications device 12. API 66 is typically a runtime environment executing on the respective wireless communication device 12. One such runtime environment is Binary Runtime Environment for Wireless® (BREW®) software developed by Qualcomm Incorporated of San Diego, Calif. Other runtime environments may be utilized that, for example, operate to control the execution of applications or programs or modules on wireless computing devices.

Additionally, processor 54 may interface with or include audio processing module 58, which provides output signals to speaker 32 and receives inputs from microphone 34. As described in more detail below, processor 54 may be configured to execute radio enhancer module 36 and initiate predetermined wireless device capabilities 38 based on one or more tags 24 and corresponding data 26 within supplemental information 22.

Memory 56 represents all of the memory associated with wireless communications device 12, and may include both random access memory (RAM) and read-only memory (ROM), erasable ROM (EPROM), electronically erasable ROM (EEPROM), flash cards, or any memory common to computer platforms. Further, memory 56 may include one or more flash memory cells, or may be any secondary or tertiary storage device, such as magnetic media, optical media, tape, or soft or hard disk. For example, computer program instructions and data utilized in the operation of wireless communications device 12 may be stored in non-volatile memory, such as EPROM, EEPROM, and/or flash memory. Additionally, memory 56 may be implemented as discrete devices, stacked devices, or may be integrated with processor 54. Memory 28 may also include areas partitioned into and designated for use as temporary memory buffers, which may store data for rendering to user interface 30 and/or for use by radio enhancer module 36 and/or predetermined capabilities 38. Further, memory 28 stores radio enhancer module 36, predetermined capability 38, and other applications 39, which are used by processor 54 in operating wireless communication device 12. For example, other applications 39 may comprise one or any combination of a voice call application, a data call application, a messaging application, a group call application, a multimedia application, a personal information manager, a usage history collection and reporting application, etc.

Additionally, communications interface 60 enables transmission and receipt of communication messages with wireless communication network 42. For example, in one aspect, communications interface 60 is embodied as a long-range transceiver coupled to antenna 62 for transmitting and receiving cellular signals to and from one or more base stations in a wireless communications network. The transceiver is a fully functional cellular radio transceiver, and operates according to any known standard, including CDMA, cdmaOne, cdma2000, UMTS, Wideband CDMA, Global System for Mobile Communications (GSM), and TIA/EIA-136.

Receiver 36 is coupled to antenna 64, and receives and demodulates signals broadcast by a radio station, such as an FM or AM or satellite radio station, for output to the user over speaker 32. Receiver 36 is operable broadcast radio transmissions 14 comprising RDS system data. As such, receiver 36 may include an RDS module 68 to decode supplemental information 22 transmitted by the broadcast radio station. To receive broadcast radio transmission 14, receiver 36 is tuned to the particular transmit frequency assigned to the broadcast radio station of interest.

RDS module 68 may comprise any circuitry operable to decode received RDS information, and in particular, supplemental information 22. For more information on RDS or RBDS in general, or on the circuitry, messaging, encoding/ decoding, please refer to International Electrotechnical Commission (IEC) standard IEC 62106, ed. 1, "United States RDBS Standard," Apr. 9, 1998 produced by the RBDS Subcommittee of the National Radio Systems Committee (NRSC), and the European Broadcasting Union (EBU)/CENELEC Standard EN50067, 1998, "Specification of the Radio Data System," each of which are incorporated herein by reference. It should be noted that these standards may apply to either FM or AM broadcasts.

Referring to FIG. 2, and as noted above, broadcast radio transmission 14 received from broadcast radio station 16 or 18 is parsed by receiver 28 into multimedia content 20 and supplemental information 22. Receiver 28 sends multimedia content 20 to audio processing module 58, which is operable to render the signal as audible sound over speaker 32. RDS module 38 also receives broadcast radio transmission 14 in order to determine if it contains any RDS data. In particular, RDS module 38 is operable to decode a 57 kHz subcarrier signal specified by the RDS standards, and extract any supplemental information 22 carried thereon.

Supplemental information 22 may include any RDS data, for example, including any one or any combination of alternate frequency (AF) data, clock date and time (CT) data, enhanced other networks (EON) data, program identification (PI) data, program item number (PIN) data, extended country code (ECC) data, program service (PS) data, scrolling program service (SPS) data, program type (PTY) data, program type name (PTYN) data, regional links (REG) data, radio text (RT) data, travel announcements (TA) data, travel program (TP) data, traffic message channel (TMC) data, music/speech switch (M/S) data, transparent data channel (TDC) data, radio paging (RP) data, in house application (IH) data, emergency warning system (EWS) data, and data from free format groups.

Once decoded, processor 54 may execute RDS module 68 to send some of supplemental information 22, such as the radio text data, to display 34 for viewing by the user. The decoded supplemental information 22 may also be used by processor 54 in executing radio enhancer module 36 and initiating predetermined capabilities 38, as described herein.

Generally, according to the RDS specifications, the RDS data is formatted in groups, and there are 16 groups divided into A and B types. These groups contain different data, such as the different types of supplemental information 22 listed above, e.g. PI, PS, PTY, PTYN, RT. An RDS encoder at broadcast radio station 16 and/or 18 may broadcast various combinations of the groups in a group sequence.

A group is formatted as 104 bits, and each group is divided into 4 blocks. A block contains 26 bits, and is divided into an Information Word and a Check Word+Offset Word. The Information Word contains 16 bits and carries data, while the Check Word+Offset Word contains 10 bits and is for error correction and synchronization.

Additionally, for each group: block 1 contains the PI code of the radio station; block 2 contains a Group Type Code that identifies the present transmitted group, a Version Flag that identifies the group as Type A or Type B, a TP flag, the PTY, and 5 individual bits; and blocks 3 and 4 contain group specific data. It should be noted that in B groups, the PI code is repeated in block 3 for better synchronization.

Figure 3:
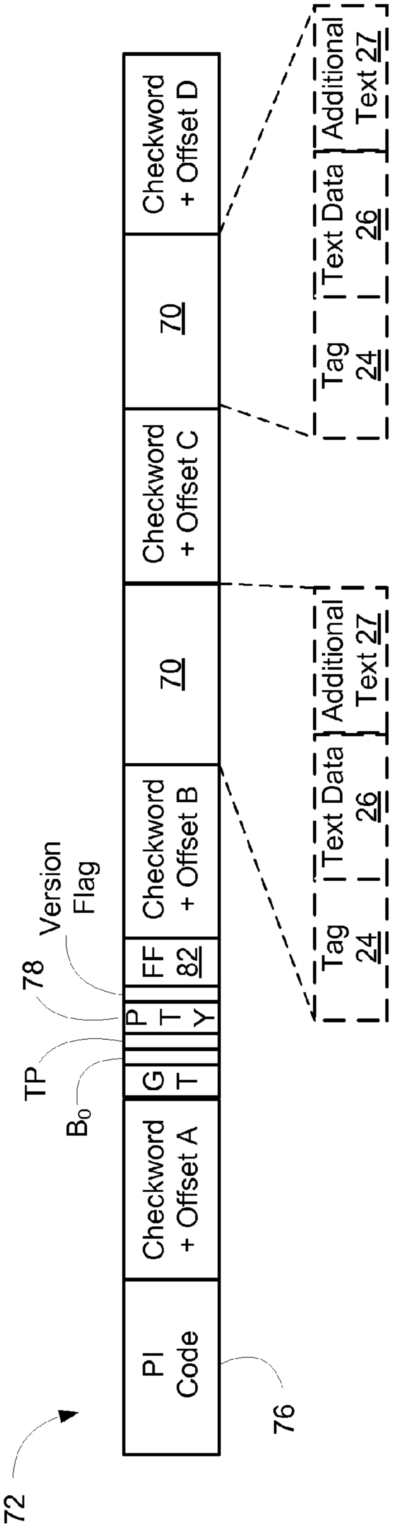
FIGS. 3-5 are representations of aspects of group messages carrying tagging language and/or supplemental information for use in the system of FIG. 1.
Figure 4:
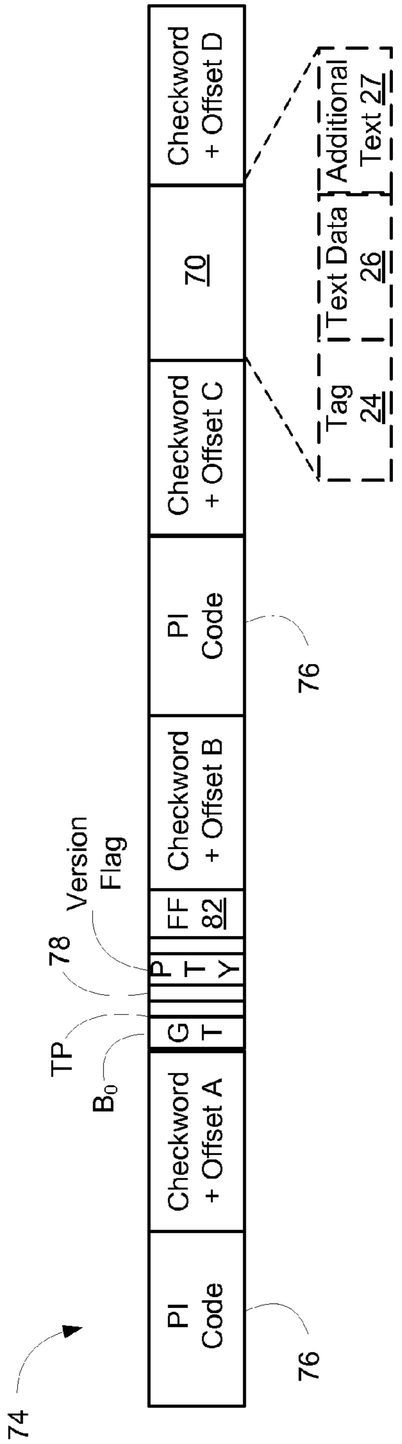

Referring to FIGS. 3 and 4, in one aspect, at least one tag 24 and corresponding data 26 may be represented in a text data portion 70 of a group A message 72 and/or a group B message 74 according to the RDS format. Although formatted differently, there is no material difference between group A message 72 and group B message 74 with respect to the operation of the present aspects. For example, text data portion 70 can include any textual data, such as predetermined codes identifiable as tags 24, text arranged relative to tag 24 so as to be identifiable as corresponding text data 26, and additional text data 27 not related to tag 24. Additionally, text data 26 may comprise any text data adjacent to tag 24, or all text data following tag 24 until another tag is reached. Further, for example, messages 72 and 74 may comprise group 2 radio text (RT) messages, group 5 transparent data channel (TDC) messages, and group 6 in house application (IH) messages.

In yet other aspects, at least one tag 24 and corresponding data 26 may be represented in text data portion 70 of a group A message 72 and/or a group B message 74, which may trigger radio enhancer module 36 to use other supplemental data 22 contained within the respective message, such as radio text (RT) data, TDC data, IH data, program information code (PI) data 76 and program type (PTY) data 78 to enable predetermined capability 38.

In yet other aspects, at least one tag 24 and corresponding data 26 may be represented in data portion 70 of one message, which may trigger radio enhancer module 36 to collect or parse data from a respective data portion 70 of a different message. For example, data portion 70 of RT and/or TDC and/or IH message may trigger radio enhancer module 36 to parse or collect data from a respective data portion 70 of a different message, such as an RT or TDC or IH message, a group 4A clock date and time (CT) message, a group 1A or 1B message including a program item number (PIN), a group 0A or 0B message including a program service name (PS) or a scrolling program service name (SPS), a group 0A, 0B and 15B message including music/speech switch (M/S), and a group 10A message including a program type name (PTYN).

Figure 5:
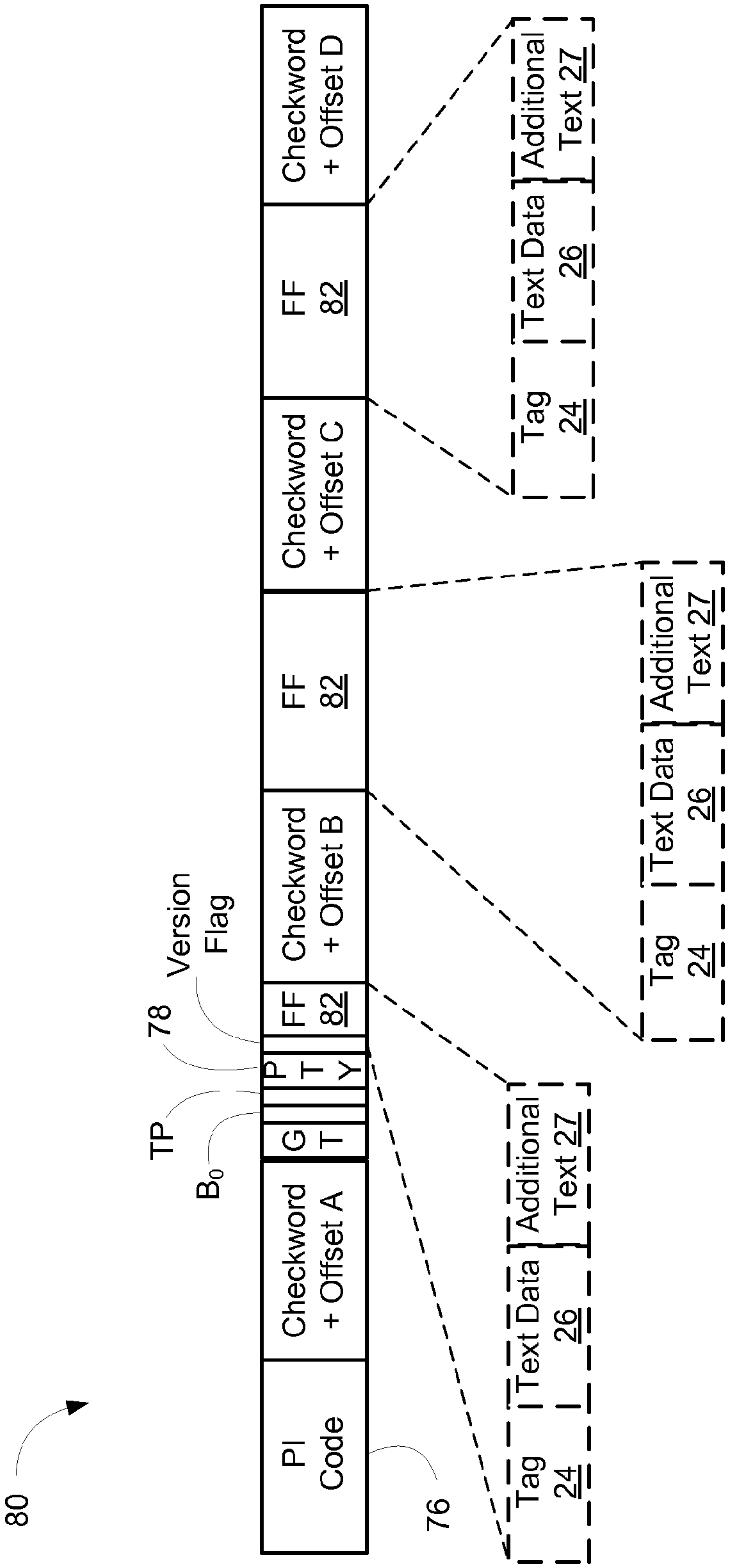

In still another aspect, referring to FIG. 5, a group 3A, 10A, 11A, 12A and 13A message 80 can be defined as including up to three free form (FF) portions 82, which may include one or more of any combination of tags 24 and corresponding text data 26, additional text data 27, all comprising supplemental data 22 (FIG. 1).

In further aspects, at least one tag 24 and corresponding data 26 may be represented in data portion 70 (FIGS. 3 and 4) or data portion 82 (FIG. 5), which may trigger radio enhancer module 36 to collect or parse data from memory 56, or from processor 54.

Referring back to FIGS. 3 and 4, in a radio text message, text data portion 70 contains bits that carry the text data, including any alphabetic character, any numeric character, any symbol, etc., which are typically rendered to display 34. For example, text data portion 70 may comprise the radio station name, the radio station slogan, the song name and the artist name.

During a given radio program or song, broadcast radio stations may transmit RT messages 72 and/or 74 several times in succession to provide redundancy to insure proper reception of all textual characters in the message. Additionally, the group sequence of a combination of groups, as noted above, may be transmitted several times to provide redundancy.

The two radio text portions 70 in group 2A message 72 comprise four characters, and can be used to send messages of up to 64 characters in length. In contrast, the single radio text portion 70 in group 2B message 74 includes only two characters, and can be used to send messages of up to 32 characters in length. As such, tag 24 may comprise a compact or short predetermined code, for example, a code of 10 characters or less, to maximize the number of remaining characters for use as corresponding data 26, and/or for additional tags 24 and corresponding text 26, and/or for additional text 27 for display.

Examples of tag 24 and corresponding data 26 include, but are not limited to, the following: "RJ:" followed by data indicating the name of the radio jockey; "Program:" followed by data indicating the name of the radio program; "Singer:" or "Singers:" or "Artist:" followed by data indicating the name of the artist; "Lyrics:" followed by data indicating the lyrics of the respective song; "Music:" followed by data indicating the source of the music; "Album:" or "CD:" indicating the album or CD on which the song is recorded; "Film:" followed by data indicating the name of the corresponding film; "Stars:" followed by data indicating the names of the stars associated with the content; "Q:" followed by data representing a query or poll; "Advt:" or "Ad:" followed by data representing an advertisement, triggers display of the advertisement until the first occurrence of another tag; ">Call:" followed by data representing a call back number, triggers automatic invocation of a call back to the call back number in response to the user activating a hot key; ">SMS:" followed by data representing a contest identifier, a call back number and a time limit, triggers automatic invocation of a messaging application, an automatic composing and transmission of a message including the aforementioned data, and a user response based on an input of a selection by the user within the time limit, may further include the device identifier, the date, the time, the station identification, the city identifier, the requesting application, and the program name; ">http://" followed by a universal resource locator (URL), triggers the invocation of a packet data session and points to the URL in response to a user selection of a generated hot key; ">Pic:" followed by data representing a name or identifier of a picture, triggers the display of a local picture file from memory; and "Collect:" followed parameters dictating the collection, storage, and reporting out, including timing and destination address, of predetermined data or data logs, which may be in the existing message, in another message, or stored within processor 54 and/or memory 56 of wireless communication device.

RDS module 38 is operable to distinguish RDS messages by analyzing the bits corresponding to group type code 84 and/or version flag 86, and thus, is able to properly decode RDS messages regardless of the group type or version that is transmitted. This may allow RDS module 38 to detect when a new radio program, such as a new song, is being transmitted. In other aspects, RDS module 38 may monitor M/S switch data in groups 0A, 0B and 15B to determine a when a radio program begins or ends, for example, to detect speech indicating a commercial.

Referring back to FIGS. 1 and 2, predetermined capabilities 38 enabled by radio enhancer module 36 based on tag 24 and corresponding data 26 and/or other supplemental data 22 may include, but is not limited to, one or any combination of: radio enhancer module 36 operating to replace corresponding text 26 with visual content, such as a graphic or video or animation that may or may not be related to and/or synchronized with the corresponding multimedia content 20, to enhance the user experience; radio enhancer module 36 operating to generate predetermined prompts or compose interactive screens or messages; radio enhancer module 36 operating to generate a hot key and enable, responsive to user input, actions such as a voice call, a data or short message service call; radio enhancer module 36 operating to trigger contextual e-commerce relating to multimedia content 20 by invoking programs or applications, or invoking data calls to a given universal resource location determined from corresponding data 26.

Figure 6:
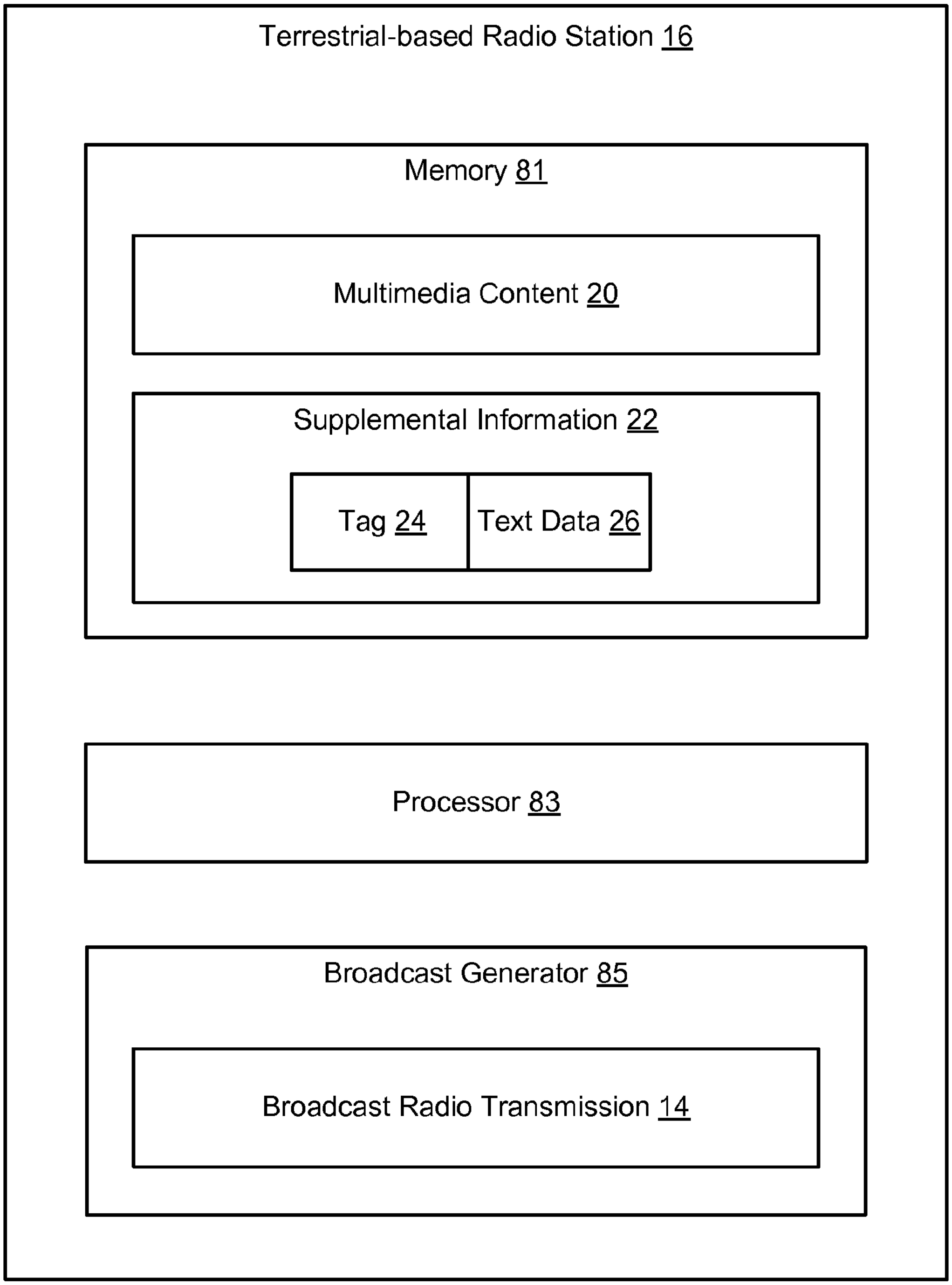
FIG. 6 is a schematic diagram of an aspect of a radio broadcaster of FIG. 1.

Referring to FIGS. 1 and 6, a radio broadcaster, such a terrestrial-based radio station 16 and satellite-based radio station 18 may comprise any hardware, software, firmware, modules data and instructions for obtaining multimedia content 20 and supplemental information 22, and generating broadcast radio transmission 14. For example, in one aspect, referring to radio station 16 for simplicity, although equally application to radio station 18, the radio broadcaster may comprise a memory 81 operable to store multimedia content 20 and supplemental information 22 corresponding to the multimedia content 20. For example, multimedia content 20 and supplemental information 22 may be obtained from a content provider, and/or may be generated or manually input at the radio broadcaster. Further, for example, according to the RDS standard, supplemental information 22 may comprise a data group from a plurality of predetermined data groups each comprising different data. Additionally, the first data group may further comprise a tag 24 and a corresponding set of text data 26. Additionally, radio broadcaster may include a processor 83 in communication with memory 81, and a broadcast generator 85 in communication with and executable by processor 83. Broadcast generator 85 is operable to generate broadcast radio transmission 14 comprising multimedia content 20 and supplemental information 22. In this case, tag 24 and the corresponding set of text data 26 included in broadcast radio transmission 14 are operable to enable predetermined capability 38 of wireless device 12 upon receipt of broadcast radio transmission 14 and responsive to a detection of tag 24 and text data 26 by the wireless device, as described herein. Additional aspects of broadcast radio transmission 14, multimedia content 20 and supplemental information 22 are further described herein.

Figure 7:
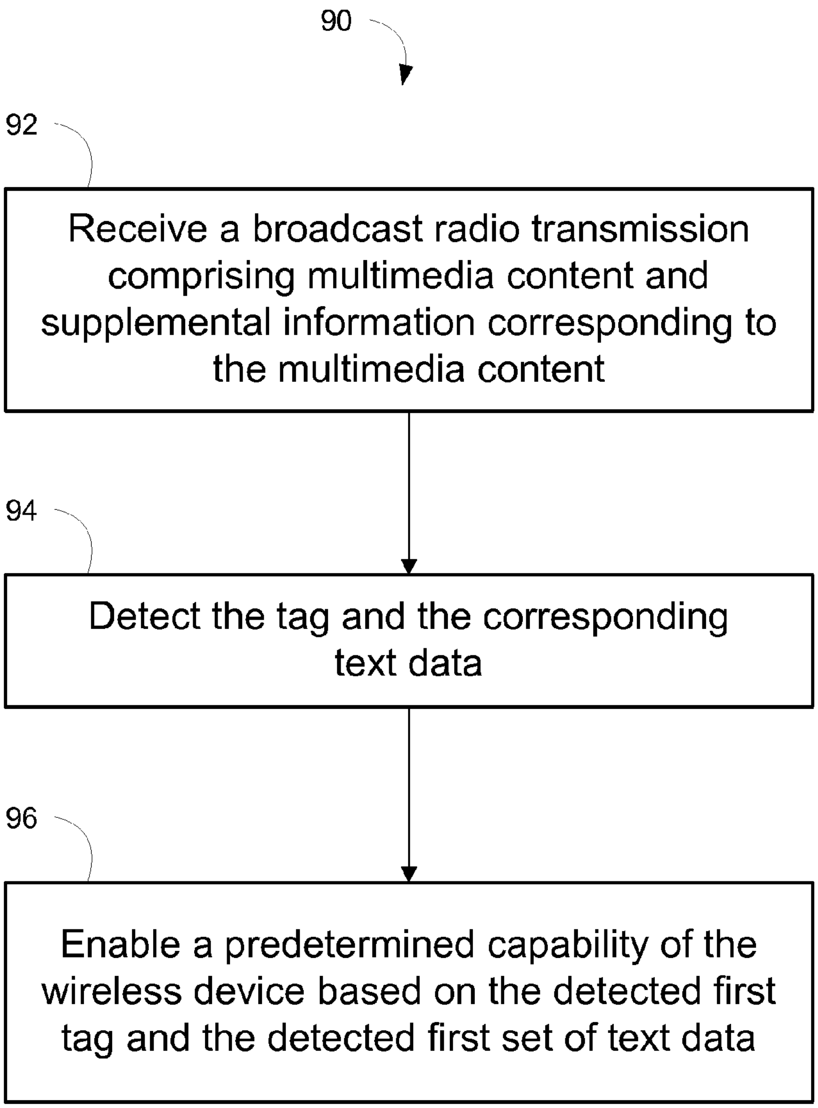
FIG. 7 is a flow chart of an aspect of a method of processing radio signals according to the system of FIG. 1.

Referring to FIG. 7, in one aspect, a method 90 by which processor 54 operates receiver 28 and radio enhancer module 38 to process radio signals on wireless communication device 12 includes receiving a broadcast radio transmission comprising multimedia content and supplemental information corresponding to the multimedia content (Block 92). In this case, the multimedia content 20 comprises the radio programming, such as a song, and the supplemental information 22 comprises the RDS data. As such, the supplemental information 22 includes a first data group from a plurality of predetermined data groups each comprising different data, such as the different RDS groups discussed above. Further, in this case, the first data group includes a first tag, such as tag 24, and a corresponding first set of text data, such as tag-related or corresponding data 26.

In a preferred aspect, receiving broadcast radio transmission 14 comprises receiving an RDS formatted signal with supplemental information 22, in particular tag 24 and corresponding data 26, in a radio text portion of a radio text group message. This provides a convenient and efficient mechanism within an existing standard to provide a configurable tag 24 and configurable corresponding data 26. Further, the radio text group message has a relatively large amount of available text characters, when compared to the other RDS format group messages, thereby providing flexibility and capacity for relatively complex tagging language formats. Additionally, the radio text group message is typically sent with every radio program, thereby increasing the efficiency of the present system by not increasing the required throughput, in a relatively limited throughput subcarrier signal (compared to other wireless communication device data services), as would be the case if additional group messages were required.

In other aspects, receiving broadcast radio transmission 14 may include receiving an RDS formatted signal with supplemental information 22 in the free text portions of at least one of a transparent data channel group message, an in house application group message, and a free form group message.

In yet other aspects, receiving broadcast radio transmission 14 may include receiving a group sequence of RDS formatted messages, where supplemental information 22 may be contained in more than one group message, and where tag 24 in one group message may relate to or reference data 26 in one or more other group messages.

The method further includes detecting the first tag and the first set of text data (Block 94). For example, processor 54 executes receiver 28 to receive and analyze broadcast radio transmission 14. If broadcast radio transmission 14 comprises a modulated signal carrying multimedia content 20 and supplemental data 22, receiver 28 operates RDS module 68 to interpret the RDS messages, and detect and parse out supplemental data 22. In some aspects, processor 54 directs receiver 28 to send the portion of broadcast radio transmission 14 corresponding to multimedia content 20 to speaker 32, while sending the portion corresponding to at least part of supplemental information 22 to display 34, both rendered for presentation to the user of wireless communication device 12. For example, in a typical case, multimedia content 20 may comprise a radio program such as a song, while the displayed portion of supplemental information 22 comprises a radio text portion of an RDS message, e.g. characters such as radio station name, song title, and artist name, which can be scrolled across a display or statically displayed.

Additionally, the method includes enabling a predetermined capability of the wireless device based on the detected first tag and the detected first set of text data (Block 96). For example, processor 54 executes radio enhancer module 36 to monitor the output of receiver 28, and in particular RDS module 68, to audio processor module 58 in order to detect the presence of supplemental information 22. Radio enhancer module 36 may include any logic operable to map each unique tag 24 to a corresponding predetermined capability 38, such as a functionality executable by wireless communication device 12 to provide interactivity between the user and the broadcast radio transmission 14, and/or to provide an enhanced user experience. For example, tag 24 may cause radio enhancer module 36 to invoke predetermined capability 38 operable to display a text data portion of an RDS message in a predetermined format, such as by rendering text data 26 on display 34 in a predetermined format corresponding to tag 24. In other aspects, tag 24 may cause radio enhancer module 36 to invoke predetermined capability 38 operable to replace predetermined codes, statements or words with graphics, pictures, animations or other text. In other words, replacing data comprises rendering predetermined content on a display on the wireless communication device, wherein the predetermined content corresponds to tag 24 and corresponding text data 26, wherein the predetermined content may be stored in memory 56 or acquired by invoking a data service application on wireless communication device 12. Further, for example, tag 24 may cause radio enhancer module 36 to invoke predetermined capability 38 operable to collect inputs from users, conveniently invoke other applications, or automatically compose messages to be sent responsive to user input.

In yet another example, such as in an example of collecting usage history information relating to radio programming, enabling the predetermined capability further comprises storing at least one of the program service name, the program identification code, the program type code, the radio text message and the clock time in a memory of the wireless device.

In a further example relating to collecting usage history information corresponding to other applications on the wireless communication device, enabling the predetermined capability further comprises controlling collection or reporting of usage of applications executed or executing on the wireless device.

In still another case, for example relating to referring radio programming to another party, receiving the broadcast radio transmission further comprises receiving a radio signal at a radio frequency corresponding to a respective radio station, and wherein enabling the predetermined capability further comprises automatically composing, in a messaging application, a tuning recommendation message to transmit to a selected address in response to a user input, wherein the tuning recommendation message comprises an indicator of the radio frequency of the radio station.

In this case, for example, the first set of text data comprises a representation of the radio frequency, and wherein automatically composing further comprises parsing the representation of the radio frequency from the first set of text data and generating the indicator of the radio frequency based on the parsing, and adding the indicator to the tuning recommendation message.

Alternatively, in the tuning recommendation case, receiving the broadcast signal may further comprises receiving supplemental information comprising at least one of the first data group further comprising at least one of a representation of a content name and a representation of an artist name corresponding to the multimedia content, and a second data group from the plurality of predetermined data groups. In this case, the second data group comprises a second set of text data different from the first set of text data, wherein the second set of text data comprises at least one of the representation of the content name and the representation of the artist name. Further, in this case, automatically composing further comprises parsing at least one of the representation of the content name and the representation of the artist name from the first set of text data from at least one of the first data group and the second data group, and adding the at least one of the representation of the content name and the representation of the artist name to the tuning recommendation message.

In yet another use case, the method may be utilized to trigger an action during a break in the normal radio programming, such as during a commercial or during talk that occurs between songs. In this case, receiving the broadcast radio transmission further comprises receiving the multimedia content having a sequence of primary content and secondary content. In this instance, the primary content represents a song, while secondary content represents talk or an advertisement. Further, in this case, receiving the broadcast radio transmission further comprises receiving the supplemental information comprising at least one of the first data group and a second data group different from the first data group, wherein one of the first data group and the second data group comprises a content identifier corresponding to the primary content or the secondary content. and wherein enabling the predetermined capability further comprises initiating the predetermined capability based on detecting the content identifier corresponding to the secondary content or detecting an absence of the content identifier corresponding to the primary content.

In a similar use case where action occurs during a break in normal programming, the chance in radio programming may be indicated by music/speech switch (M/S) or group type (GT) code or version flag (VF).

Additionally, in a case where another application is invoked by tag 24 and data 26, enabling the predetermined capability 38 of wireless communication device 12 further comprises at least one of invoking a content download application, invoking a data call application, invoking a voice call application, invoking a web browsing application, automatically composing at least a portion of a response to a query, rendering content stored in a memory of the wireless device on an output device on the wireless device, and changing a functionality of the wireless device.

Figure 8:
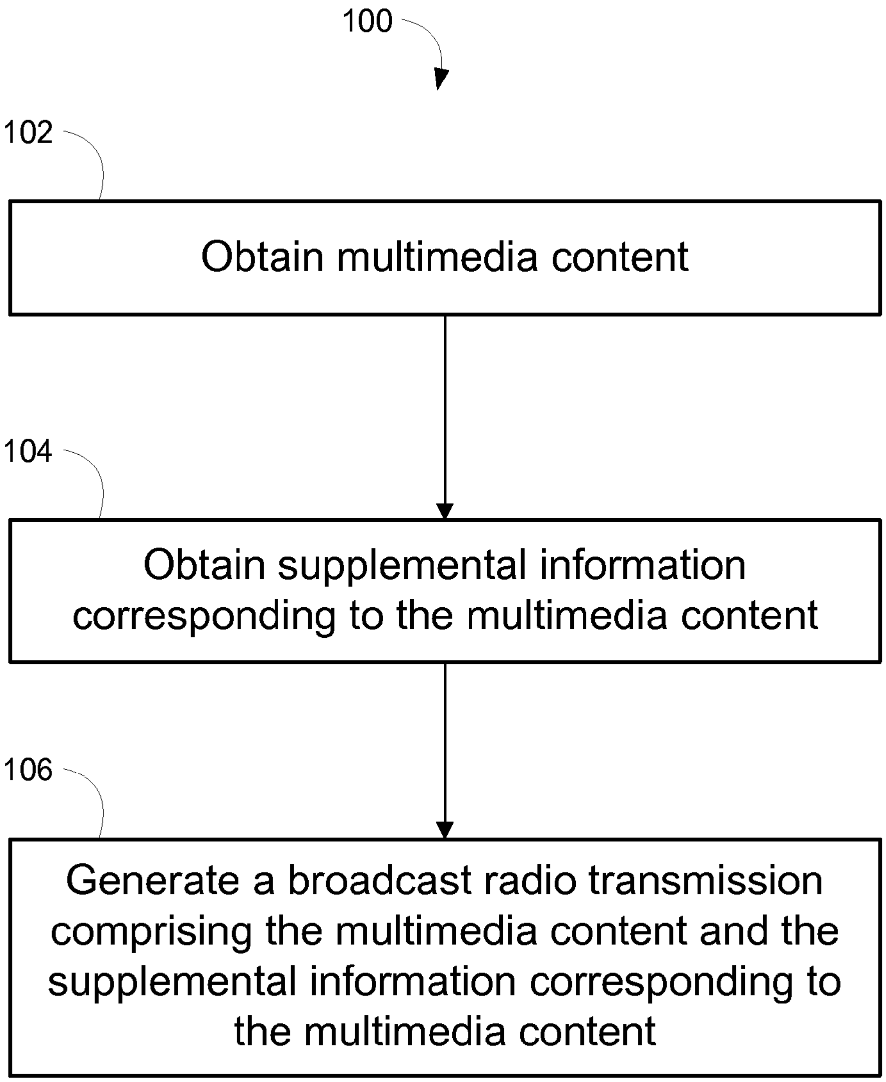
FIG. 8 is a flow chart of an aspect of a method of generating radio signals according to the system of FIG. 1.

Referring to FIG. 8, one aspect of a method 100 of generating radio signals for broadcast, comprises obtaining multimedia content (Block 102) and obtaining supplemental information corresponding to the multimedia content (Block 104).

For example, obtaining the multimedia content 20 may include obtaining content such as music, videos, talk shows, news reports, etc., which may be real-time content and/or non-real-time content.

For example, obtaining the supplemental information 22 may include obtaining supplemental information comprising a first data group from a plurality of predetermined data groups each comprising different data, wherein the first data group further comprises a first tag 24 and a corresponding first set of text data 26. In this case, the supplemental information 22 may comprise RDS data in an RDS group message format, as is discussed above in detail.

In some aspects, the method includes obtaining the supplemental information 22 in a radio data system format or a radio broadcast data system format, wherein the first data group comprises at least one of a radio text message group, a transparent data channel message group, an in house applications message group, and a free form message group.

In other aspects, the method includes obtaining the first data group in the form of a message in a radio data system format or a radio broadcast data system format, wherein the message comprises at least one of a group 2A message, a group 2B message, a group 3A message, a group 5A message, a group 5B message, a group 6A message, a group 6B message, a group 10A message, a group 11A message, a group 12A message, and a group 13A message.

The method further comprises generating a broadcast radio transmission comprising the multimedia content and the supplemental information corresponding to the multimedia content (Block 106). For example, broadcasting of the first tag 24 and the first set of text data 26 in the supplemental information are operable to enable a predetermined capability of a wireless device 12 in receipt of the broadcast radio transmission 14 and responsive to a detection of the first tag 24 and the first set of text data 26 by the wireless device 12. These aspects are discussed in detail above with respect to wireless device 12.

In some aspects, the method includes generating the broadcast radio transmission to enable controlling collection or reporting of wireless device usage data.

In other aspects, the method includes obtaining the supplemental information having a second data group from the plurality of predetermined data groups, wherein the second data group further comprises a second set of text data different from the first set of text data, and the method includes generating the broadcast radio transmission to enable storing the second set of text data in a memory of the wireless device.

In further aspects, the method includes generating the broadcast radio transmission as a radio signal at a radio frequency corresponding to a radio station, and the method includes generating the broadcast radio transmission to enable automatically composing, in a messaging application resident on the wireless device, a tuning recommendation message to transmit to a selected address in response to a user input received by the wireless device, wherein the tuning recommendation message comprises an indicator of the radio frequency of the radio station.

In yet other aspects, the method includes generating the multimedia content in a sequence of primary content and secondary content, wherein obtaining the supplemental information further comprises obtaining at least one of the first data group and a second data group different from the first data group, wherein one of the first data group and the second data group comprises a content identifier corresponding to the primary content or the secondary content, and wherein generating the broadcast radio transmission is further operable to initiate the predetermined capability based on the wireless device detecting the content identifier corresponding to the secondary content or detecting an absence of the content identifier corresponding to the primary content.

In still further aspects, the method may include generating the broadcast radio transmission as being further operable to enable, at the wireless device, at least one of invoking a content download application, invoking a data call application, invoking a voice call application, invoking a web browsing application, automatically composing at least a portion of a response to a query, rendering content stored in a memory of the wireless device on an output device on the wireless device, and changing a functionality of the wireless device.

Thus, the present aspects provide a tagging language for use in a broadcast radio system that efficiently utilizes an existing standard, provides a compact data size when compared to alternatives that require extra messages and extra streaming channels, is configurable in free text portions of the standard group messages, and includes configurable capabilities programmable onto the wireless communication device.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of processing radio signals on a wireless device, comprising:

receiving a broadcast radio transmission comprising multimedia content and supplemental information corresponding to the multimedia content, wherein the supplemental information comprises a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

detecting the first tag and the first set of text data from the first data group; and enabling a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

2. The method of claim 1, wherein receiving the broadcast radio transmission further comprises receiving the supplemental information in a radio data system format or a radio broadcast data system format, wherein the first data group comprises at least one of a radio text message group, a transparent data channel message group, an in house applications message group, and a free form message group.

3. The method of claim 1, wherein receiving the supplemental information comprising the first data group further comprises receiving a message in a radio data system format or a radio broadcast data system format, wherein message comprises at least one of a group 2A message, a group 2B message, a group 3A message, a group 5A message, a group 5B message, a group 6A message, a group 6B message, a group 10A message, a group 11A message, a group 12A message, and a group 13A message.

4. The method of claim 1, wherein controlling collection or reporting of wireless device usage data further comprises defining at least one parameter relating to at least one data type to store in a memory of the wireless device.

5. The method of claim 1, wherein controlling collection or reporting of wireless device usage data further comprises defining at least one parameter relating to at least one data type or at least one data log to retrieve from a memory of the wireless device and transmit to a predetermined address.

6. The method of claim 1, wherein receiving the broadcast radio transmission further comprises receiving the supplemental information having a second data group from the plurality of predetermined data groups, wherein the second data group further comprises a second set of text data different from the first set of text data, and wherein enabling the predetermined capability further comprises storing the second set of text data in a memory of the wireless device.

7. The method of claim 1, wherein receiving the broadcast radio transmission further comprises receiving the supplemental information having a second data group from the plurality of predetermined data groups, wherein the second data group comprises a second set of text data different from the first set of text data, wherein the second set of text data represents at least one of a program service name, a program identification code, a program type code, a radio text message and a clock time, and wherein enabling the predetermined capability further comprises storing at least one of the program service name, the program identification code, the program type code, the radio text message and the clock time in a memory of the wireless device.

8. The method of claim 1, wherein receiving the broadcast radio transmission further comprises receiving the multimedia content having a sequence of primary content and secondary content, wherein one of the first data group and the second data group comprises a content identifier corresponding to the primary content or the secondary content, and wherein enabling the predetermined capability further comprises initiating the predetermined capability based on detecting the content identifier corresponding to the secondary content or detecting an absence of the content identifier corresponding to the primary content.

9. The method of claim 8, wherein initiating the predetermined capability further comprises at least one of rendering content stored in a memory of the wireless device on an output device on the wireless device, invoking a web browsing application, invoking a voice call application, and or invoking a data call application.

10. The method of claim 1, wherein receiving the broadcast radio transmission further comprises receiving the multimedia content having a sequence of primary content and secondary content, wherein one of the first data group and the second data group comprises at least one of a music/speech switch code or group type code or version flag corresponding to the primary content or the secondary content, and wherein enabling the predetermined capability further comprises initiating the predetermined capability based on detecting the at least one of a music/speech switch code or group type code or version flag corresponding to the secondary content or detecting an absence of the at least one of a music/speech switch code or group type code or version flag corresponding to the primary content.

11. The method of claim 1, wherein enabling the predetermined capability of the wireless device further comprises at least one of invoking a content download application, invoking a data call application, invoking a voice call application, invoking a web browsing application, automatically composing at least a portion of a response to a query, rendering content stored in a memory of the wireless device on an output device on the wireless device, or changing a functionality of the wireless device.

12. The method of claim 1, further comprising rendering the first set of text data on a display on the wireless device in a predetermined format corresponding to the first tag.

13. The method of claim 1, further comprising rendering predetermined content on a display on the wireless communication device, wherein the predetermined content corresponds to the first tag and the first set of text data.

14. The method of claim 1, wherein the usage data comprises usage of applications executed or executing on the wireless device.

15. At least one processor configured to processing radio signals on a wireless device, comprising:

a first module for receiving a broadcast radio transmission comprising multimedia content and supplemental information corresponding to the multimedia content, wherein the supplemental information comprises a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

a second module for detecting the first tag and the first set of text data from the first data group; and a third module for enabling a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

16. A computer program product, comprising:

a non-transitory computer-readable medium comprising:

a first set of codes for causing a computer to receive a broadcast radio transmission comprising multimedia content and supplemental information corresponding to the multimedia content, wherein the supplemental information comprises a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

a second set of codes for causing the computer to detect the first tag and the first set of text data from the first data group; and a third set of codes for causing the computer to enable a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

17. An apparatus, comprising:

means for receiving a broadcast radio transmission comprising multimedia content and supplemental information corresponding to the multimedia content, wherein the supplemental information comprises a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

means for detecting the first tag and the first set of text data from the first data group; and means for enabling a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

18. A wireless device, comprising:

a memory comprising a radio enhancer module;

a processor in communication with the memory and operable to execute the radio enhancer module;

a receiver in communication with the processor, wherein the receiver is operable to receive a broadcast radio transmission comprising multimedia content and supplemental information corresponding to the multimedia content, wherein the supplemental information comprises a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

a receiver module associated with the receiver, wherein the receiver module comprises circuitry operable to detect the first tag and the first set of text data from the first data group; and wherein the processor executes the radio enhancer module to monitor the receiver module; and wherein the radio enhancer module is operable responsive to detection of the first tag and first set of text data to enable a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

19. The wireless device of claim 18, wherein the supplemental information comprises a radio data system format or a radio broadcast data system format, wherein the first data group comprises at least one of a radio text message group, a transparent data channel message group, an in house applications message group, and a free form message group.

20. The wireless device of claim 18, wherein the first data group further comprises a message in a radio data system format or a radio broadcast data system format, wherein message comprises at least one of a group 2A message, a group 2B message, a group 3A message, a group 5A message, a group 5B message, a group 6A message, a group 6B message, a group 10A message, a group 11A message, a group 12A message, and a group 13A message.

21. The wireless device of claim 18, wherein the first set of text data further comprises at least one parameter relating to at least one data type to store in the memory.

22. The wireless device of claim 18, wherein the first set of text data further comprises at least one parameter relating to at least one data type or at least one data log to retrieve from the memory of the wireless device and to transmit to a predetermined address.

23. The wireless device of claim 18, and wherein the radio enhancer module is further operable to initiate storage of the second set of text data in the memory.

24. The wireless device of claim 18, wherein the radio enhancer module is further operable to initiate storage of at least one of the program service name, the program identification code, the program type code, the radio text message and the clock time in the memory.

25. The wireless device of claim 18, wherein receiving the multimedia content further comprises a sequence of primary content and secondary content, wherein one of the first data group and the second data group comprises at least one of a music/speech switch code or group type code or version flag corresponding to the primary content or the secondary content, and wherein the radio enhancer module is further operable to initiate the predetermined capability based on detecting the at least one of a music/speech switch code or group type code or version flag corresponding to the secondary content or detecting an absence of the at least one of a music/speech switch code or group type code or version flag corresponding to the primary content.

26. The wireless device of claim 18, further comprising an output device, wherein the memory further comprises a content download application, a data call application, a voice call application, a web browsing application, predetermined content, a web browsing application, a voice call application, and a data call application, wherein the radio enhancer module is further operable to initiate at least one of invoking the content download application, invoking the data call application, invoking the voice call application, invoking the web browsing application, automatically composing at least a portion of a response to a query, rendering the predetermined content on the output device, and or changing a functionality of the wireless device.

27. The wireless device of claim 18, further comprising a display, wherein the radio enhancer module further comprises a predetermined format corresponding to the first tag, wherein the radio enhancer module is further operable to initiate rendering the first set of text data on the display in the predetermined format.

28. The wireless device of claim 18, further comprising a display, wherein the radio enhancer module further comprises a predetermined format corresponding to the first tag and the first set of text data, wherein the radio enhancer module is further operable to initiate rendering predetermined content on the display based on the first tag and the first set of text data.

29. A wireless device, comprising:

a memory comprising a radio enhancer module;

a processor in communication with the memory and operable to execute the radio enhancer module;

a receiver in communication with the processor, wherein the receiver is operable to receive a broadcast radio transmission comprising multimedia content and supplemental information corresponding to the multimedia content, wherein the supplemental information comprises a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

a receiver module associated with the receiver, wherein the receiver module comprises circuitry operable to detect the first tag and the first set of text data from the first data group; and wherein the processor executes the radio enhancer module to monitor the receiver module;

wherein the radio enhancer module is operable responsive to detection of the first tag and first set of text data to initiate enabling a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device; and wherein the memory further comprises other wireless device applications.

30. The wireless device of claim 29, wherein the multimedia content further comprises a sequence of primary content and secondary content, wherein one of the first data group and the second data group comprises a content identifier corresponding to the primary content or the secondary content, and wherein the radio enhancer module is further operable to initiate the predetermined capability based on detecting the content identifier corresponding to the secondary content or detecting an absence of the content identifier corresponding to the primary content.

31. The wireless device of claim 30, further comprising an output device, wherein the memory further comprises predetermined content, a web browsing application, a voice call application, and a data call application, wherein the radio enhancer module is further operable to initiate at least one of rendering the predetermined content on the output device, invoking the web browsing application, invoking the voice call application, or invoking the data call application.

32. A method of generating radio signals for broadcast, comprising:

obtaining multimedia content;

obtaining supplemental information corresponding to the multimedia content, the supplemental information comprising a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

generating a broadcast radio transmission comprising the multimedia content and the supplemental information corresponding to the multimedia content; and wherein the first tag and the first set of text data are operable to enable a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

33. The method of claim 32, wherein obtaining the supplemental information further comprises obtaining the supplemental information in a radio data system format or a radio broadcast data system format, wherein the first data group comprises at least one of a radio text message group, a transparent data channel message group, an in house applications message group, and a free form message group.

34. The method of claim 32, wherein obtaining the supplemental information comprising the first data group further comprises obtaining a message in a radio data system format or a radio broadcast data system format, wherein message comprises at least one of a group 2A message, a group 2B message, a group 3A message, a group 5A message, a group 5B message, a group 6A message, a group 6B message, a group 10A message, a group 11A message, a group 12A message, and a group 13A message.

35. The method of claim 32, wherein generating the broadcast radio transmission further comprises controlling collection or reporting of usage of applications executed or executing on the wireless device.

36. The method of claim 32, wherein generating the broadcast radio transmission is further operable to enable storing the second set of text data in a memory of the wireless device.

37. The method of claim 32, wherein generating the broadcast radio transmission further comprises generating a radio signal at a radio frequency corresponding to a radio station, and wherein generating the broadcast radio transmission is further operable to enable automatically composing, in a messaging application resident on the wireless device, a tuning recommendation message to transmit to a selected address in response to a user input received by the wireless device, wherein the tuning recommendation message comprises an indicator of the radio frequency of the radio station.

38. The method of claim 32, wherein generating the broadcast radio transmission further comprises generating the multimedia content in a sequence of primary content and secondary content, wherein one of the first data group and the second data group comprises a content identifier corresponding to the primary content or the secondary content, and wherein generating the broadcast radio transmission is further operable to initiate the predetermined capability based on the wireless device detecting the content identifier corresponding to the secondary content or detecting an absence of the content identifier corresponding to the primary content.

39. The method of claim 38, wherein enabling the predetermined capability further comprises at least one of rendering content stored in a memory of the wireless device on an output device on the wireless device, invoking a web browsing application, invoking a voice call application, and or invoking a data call application.

40. The method of claim 32, wherein generating the broadcast radio transmission is further operable to enable, at the wireless device, at least one of invoking a content download application, invoking a data call application, invoking a voice call application, invoking a web browsing application, automatically composing at least a portion of a response to a query, rendering content stored in a memory of the wireless device on an output device on the wireless device, or changing a functionality of the wireless device.

41. The method of claim 32, wherein the broadcast radio transmission further comprises a radio signal at a radio frequency corresponding to a radio station, and further comprising automatically composing, based on the transmission, a tuning recommendation message to transmit to a selected address in response to a user input, wherein the tuning recommendation message comprises an indicator of the radio frequency of the radio station.

42. At least one processor configured to processing radio signals on a wireless device, comprising:

a first module for obtaining multimedia content;

a second module for obtaining supplemental information corresponding to the multimedia content, the supplemental information comprising a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

a third module for generating a broadcast radio transmission comprising the multimedia content and the supplemental information corresponding to the multimedia content; and wherein the first tag and the first set of text data are operable to enable a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

43. A computer program product, comprising:

a non-transitory computer-readable medium comprising:

a first set of codes for causing a computer to obtain multimedia content;

a second set of codes for causing the computer to obtain supplemental information corresponding to the multimedia content, the supplemental information comprising a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

a third set of codes for causing the computer to generate a broadcast radio transmission comprising the multimedia content and the supplemental information corresponding to the multimedia content; and wherein the first tag and the first set of text data are operable to enable a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

44. An apparatus, comprising:

means for obtaining multimedia content;

means for obtaining supplemental information corresponding to the multimedia content, the supplemental information comprising a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

means for generating a broadcast radio transmission comprising the multimedia content and the supplemental information corresponding to the multimedia content; and wherein the first tag and the first set of text data are operable to enable a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

45. A radio broadcaster, comprising:

a memory comprising multimedia content and supplemental information corresponding to the multimedia content, wherein the supplemental information comprises a first data group and a second data group from a plurality of predetermined data groups each comprising different data, wherein the first data group further comprises a first tag and a corresponding first set of text data and the second data group further comprises a second set of text data different from the first set of text data, wherein the second set of text data represents at least one of a program service name, a program identification code, a program type code, a radio text message and a clock time;

a processor in communication with the memory;

a broadcast generator in communication with the processor, wherein the broadcast generator is operable to generate a broadcast radio transmission comprising the multimedia content and the supplemental information; and wherein the first tag and the first set of text data are operable to enable a predetermined capability on the wireless device based on the detecting of the first tag and the first set of text data, wherein the enabled predetermined capability comprises functionality related to promote user interactive activity or enhance user experience, wherein the enabling of the predetermined capability further comprises storing at least one of the program service name, the program identification code, the program type code, the radio text message and the clock time in a memory of the wireless device.

46. The radio broadcaster of claim 45, wherein the supplemental information further comprises information in a radio data system format or a radio broadcast data system format, wherein the first data group comprises at least one of a radio text message group, a transparent data channel message group, an in house applications message group, and a free form message group.

47. The radio broadcaster of claim 45, wherein the first data group further comprises a message in a radio data system format or a radio broadcast data system format, wherein message comprises at least one of a group 2A message, a group 2B message, a group 3A message, a group 5A message, a group 5B message, a group 6A message, a group 6B message, a group 10A message, a group 11A message, a group 12A message, and a group 13A message.

48. The radio broadcaster of claim 45, wherein the broadcast generator is further operable, via generation of the broadcast radio transmission, to enable controlling collection or reporting of usage of applications executed or executing on the wireless device.

49. The radio broadcaster of claim 45, and wherein the broadcast generator is further operable, via generation of the broadcast radio transmission, to enable storing the second set of text data in a memory of the wireless device.

50. The radio broadcaster of claim 45, wherein broadcast radio transmission comprises a radio signal at a radio frequency corresponding to a radio station, and wherein the broadcast generator is further operable, via generation of the broadcast radio transmission, to enable the wireless device to automatically compose, in a messaging application resident on the wireless device, a tuning recommendation message to transmit to a selected address in response to a user input received by the wireless device, wherein the tuning recommendation message comprises an indicator of the radio frequency of the radio station.

51. The radio broadcaster of claim 45, wherein the multimedia content further comprises a sequence of primary content and secondary content, wherein one of the first data group and the second data group comprises a content identifier corresponding to the primary content or the secondary content, and wherein the broadcast generator is further operable, via generation of the broadcast radio transmission, to initiate the predetermined capability based on the wireless device detecting the content identifier corresponding to the secondary content or detecting an absence of the content identifier corresponding to the primary content.

52. The radio broadcaster of claim 51, wherein enabling the predetermined capability further comprises at least one of rendering content stored in a memory of the wireless device on an output device on the wireless device, invoking a web browsing application, invoking a voice call application, and or invoking a data call application.

53. The radio broadcaster of claim 45, wherein the broadcast generator is further operable, via generation of the broadcast radio transmission, to enable, at the wireless device, at least one of invoking a content download application, invoking a data call application, invoking a voice call application, invoking a web browsing application, automatically composing at least a portion of a response to a query, rendering content stored in a memory of the wireless device on an output device on the wireless device, or changing a functionality of the wireless device.

54. The radio broadcaster of claim 45, wherein the broadcast radio transmission further comprises a radio signal at a radio frequency corresponding to a radio station, and wherein the transmission is operable to cause a radio enhancer module to initiate a messaging application to automatically compose a tuning recommendation message to transmit to a selected address in response to a user input, wherein the tuning recommendation message comprises an indicator of the radio frequency of the radio station.

* * * * *